(No Model.)
W. E. DOUBLEDAY.
MANUFACTURING HATS AND OTHER FUR FACED FABRICS.
No. 255,260. Patented Mar. 21, 1882.
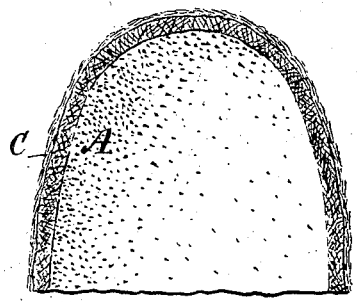
Fig. 1.
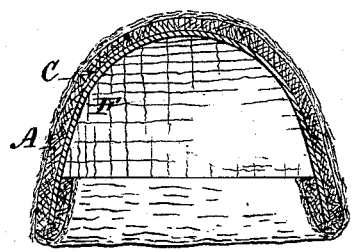
Fig. 2.
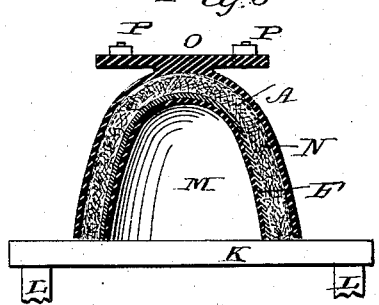
Fig. 5.
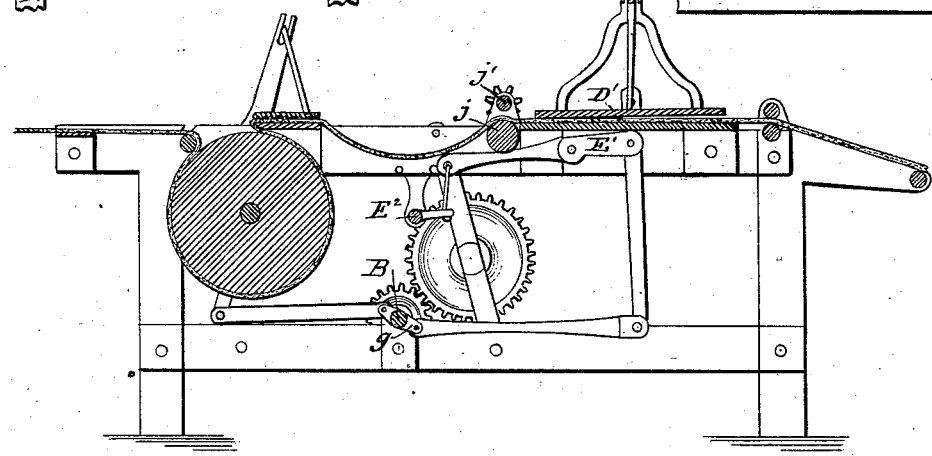
Fig. 4.
Fig. 3.
Witnesses
J. S. Barker.
H. N. Low
Inventor:
William E. Doubleday
by Doubleday & Bliss
Attys.

UNITED STATES PATENT OFFICE.

WILLIAM E. DOUBLEDAY, OF NEW YORK, N. Y., ASSIGNOR TO ELLEN M. DOUBLEDAY, OF SAME PLACE.

MANUFACTURING HATS AND OTHER FUR-FACED FABRICS.

SPECIFICATION forming part of Letters Patent No. 255,260, dated March 21, 1882.

Application filed January 19, 1882. (No model.)

*To all whom it may concern:*

Be it known that I, WILLIAM E. DOUBLEDAY, a citizen of the United States of America, residing at New York city, in the county of New York and State of New York, have invented certain new and useful Improvements in Manufacturing Hats and other Fur-Faced Fabrics; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a vertical section of a bat employed by me in carrying out my invention. Fig. 2 is a vertical section of the same bat placed upon a hat-body preparatory to the "sticking" process. Fig. 3 is an elevation of a machine adapted for use in carrying out my invention. Fig. 4 is a top view of another form of machine which I propose to use in carrying out my invention. Fig. 5 is a vertical section of the same, taken on line X Y, Fig. 4.

I will briefly describe a machine which I propose to use in carrying out my invention, such machine being shown and described in Patent No. 95,863, although I may employ any other machine of similar construction with such modification as I propose to make in this one.

Referring to Fig. 3, D' is the platen or jigger-plate, to which a rapidly-vibrating motion is imparted by means of cranks $g$, mounted on shaft B, the platen being elevated automatically through the medium of cam, (not shown,) rock-shaft $E^2$, and levers E', to permit the feeding forward of the material which is being felted or hardened, this feeding being done by means of rollers $jj'$, actuated by a cam and connecting devices.

In Fig. 1, A represents a conical bat, formed of fur, preferably nutria, formed by blowing the same upon a rotated perforated cone, in substantially the manner commonly employed for that purpose. C is an outer layer of raw cotton, which has been blown upon the bat of fur by the same machinery. In forming these cones I prefer to spread the fur in a thin layer upon a feeding-apron and place upon the same apron, but in rear of the fur, a thin layer of cotton, so that the cotton will be deposited upon the outer surface of the fur by the automatic operation of the machine. After the bat has thus been formed I remove it from the perforated cone, either in the condition in which it is formed, or by wrapping it with a wet cloth and then removing the bat and cloth together. This cone is of substantially the same taper and size as the hat-body to which it is to be applied, except that the cone is made as much longer than the body as is necessary to permit the lower edge of the fur and cotton bat to be turned inward over the edge of the hat-body F to form a fur-lined brim of the hat, as is indicated in Fig. 2, and after the body has been placed within the bat and the edge of the bat turned over within the lower edge of the body the two are flattened out, so that the two cotton surfaces of the brim come in contact with each other, as do the inner surfaces of the hat-body between the brim and the apex of the triangular-shaped compound material thus shown; or, when preferred, a sheet of thin oiled paper or other suitable material—such as cotton-cloth—may be placed between the adjacent surfaces of the cotton on the brim.

It will of course be understood that the extreme edge of the bat is of greater diameter than that portion of the hat-body which is adjacent to it after the bat has been turned inward, as indicated in Fig. 2, and that consequently the portion of the bat will be wrinkled or laid in folds when the article has been flattened out, with its inner portions in contact with each other, which is not, however, a serious objection, as will be explained. I now place a number of these bats and bodies between the bed-plate and platen of the hardener, Fig. 3, and subject the same to the rapid vibratory motion of the platen accompanied by heat or otherwise, as circumstances shall indicate, and, when preferred, I place sheets of paper, cloth, or other suitable material between the hat and the bed-plate and platen of the machine. After this vibratory motion has been continued for a short time, dependent upon circumstances and conditions of temperature and moisture, the fur will be found to be stuck to the body of the hat, after which the hat is subjected to the usual scalding process.

It will be found upon completing the scalding operation that the surplus of fur which was produced by the wrinkling or folding above mentioned will come away when the layer of cotton is removed, leaving the hat-body thoroughly covered with firmly-attached fur; or, when desired, the operation may be varied by placing the hat-body within the conical bat of fur and cotton, and then cutting off or otherwise separating that portion of the bat of fur and cotton which projects beyond the open end of the hat-body, thus forming a ring or band which may be used for covering the under brim of the hat with fur, such operation being performed separately—that is to say, in such case I stick the fur to the outer face of the hat-body, and afterward turn the hat wrong-side out, place upon its outer face the ring or band of fur and cotton and stick it separately—having found by experience that in such operation the fur can be made to adhere to and cover perfectly the lower edge of the hat in as satisfactory a manner as such lower edge can be covered by turning the bat over the edge of the hat-body, as I have first described, and may be able to produce results which are in some respects more satisfactory than those I can produce by the first-described operation, owing to the fact that when carrying out such first-described method the material which is acted upon by the platen or jigger is not of uniform thickness, it being much thicker at the point occupied by the under brim than at the other portions of the hat, as will be readily understood by an examination of Fig. 2.

While I employ a well-known machine—say that represented in Fig. 3—in sticking the fur to the felt or other fabric of which the hat-body is composed, yet this operation is not at all analogous in many respects to the operation of hardening or felting for which such machines are usually employed. In the ordinary use of these machines the platen rests with its entire weight upon a comparatively loose mass of fur, wool, or mixed fibers, and operates to unite them firmly and throughout their entire lengths into a firm, hard, compact material called "felt," of much less thickness when completed than is the bat when the felting operation is commenced; but in carrying out my invention I so manipulate the machine that only one end of each of the fibers or filaments of which the fur is composed is attached to the hat-body, leaving the rest of the fibers in a light, loose, flowing condition, substantially like that in which the fur exists upon the animal from which it is taken.

In carrying out my invention either a very light platen must be used with a short period of vibration or else the machine must be so constructed that the platen cannot rest with its full weight upon the material, otherwise, instead of sticking the fur to the body of the hat, it, the fur, will be felted not only to the body of the hat, but the filaments of the fur will be felted to each other, so that they will not flow, and thereby the end sought to be attained by my invention will be entirely frustrated.

In Figs. 4 and 5 I have shown another mechanism which I can employ in sticking fur to such cone-shaped articles—as, for instance, hats. In these figures, K is a bed-plate supported on legs L L, and having secured to its upper surface a dome or cone-shaped receiver, M, of such size as to receive conveniently a hat-body, F, with a fur bat, A, placed upon it. N is a correspondingly-shaped shell or hood, adapted to fit closely the outer surface of the fur bat, which by preference has a cotton covering substantially like that shown in Figs. 1 and 2. O is a yoke or cross-bar firmly attached to the apex of the shell or hood N, and connected by means of pitmen P P with a a double crank, Q, the crank being supported in suitable bearings attached to the bed-plate K, but not shown in the drawings.

From an examination of Figs. 4 and 5 it will be seen that when the crank-shaft Q is rotated it will impart an oscillating movement to the shell or hood N, and thus stick the fur, substantially as the same operation will be performed by the machine shown in Fig. 3. It will also be seen that in both machines the surfaces between which the material is pressed and subjected to a rubbing action are substantially parallel with each other, and that the fibers of the fur are subjected to a forward and backward rubbing action between such parallel surfaces.

From the above description it will be seen that by the use of my invention I am enabled to stick the fur upon the entire outer surface of a hat, and also upon that portion which forms the under brim, at one operation and without either removing the hat from between the jigger and platen or turning the hat over, thus sticking the fur to practically four surfaces at once—that is to say, the upper and lower surfaces of the hat when it is flattened out, and also to the two adjacent inner surfaces.

Another mode in which I may carry out my invention is this: I propose to take a piece of woven fabric composed wholly or in part of animal fiber or fur which is capable of having fur stuck to it, then apply to one or both surfaces a thin layer of fur, and subject the same to the action of the jigger until the fur is suitably stuck to the woven fabric. After the completion of the sticking process it is then scalded in the usual manner, when it will be in suitable condition for being molded or pressed into the desired shape for a hat.

Before shaping or molding, or even before sticking, I may, if preferred, size the fabric or otherwise treat it to further insure that it shall retain the desired form.

I do not in this case claim any invention except such as specifically set forth in the claims hereof, reserving to myself the right to claim any other patentable features which are shown or described in another application which I have filed as a division hereof.

What I claim is—

1. The herein-described improvement in the manufacture of fur-napped fabrics, which consists in applying a layer of fur to a fabric composed wholly or in part of feltable fiber, and which has been previously manufactured and has the density and thickness which it is desired it shall have after the fur has been stuck, and then subjecting the material to the combined pressing and rubbing action of a vibrating jigger.

2. The herein-described method of sticking fur to a previously-felted hat-body—that is to say, by applying a layer of fur to the felted hat-body and then subjecting the material to the combined pressing and rubbing action of a vibrating jigger, substantially as set forth.

In testimony whereof I affix my signature in presence of two witnesses.

WILLIAM E. DOUBLEDAY.

Witnesses:
  R. S. HAYWARD,
  FRANK G. STILES.